(12) United States Patent
Lin

(10) Patent No.: US 7,283,549 B2
(45) Date of Patent: Oct. 16, 2007

(54) METHOD FOR INCREASING THE TRANSMIT AND RECEIVE EFFICIENCY OF AN EMBEDDED ETHERNET CONTROLLER

(75) Inventor: Jin-Fun Lin, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 1152 days.

(21) Appl. No.: 10/196,424

(22) Filed: Jul. 17, 2002

(65) Prior Publication Data

US 2004/0015598 A1    Jan. 22, 2004

(51) Int. Cl.
*H04L 12/28* (2006.01)

(52) U.S. Cl. ........................... 370/413; 370/466
(58) Field of Classification Search .................. None
See application file for complete search history.

(56) References Cited

U.S. PATENT DOCUMENTS 6,157,955 A * 12/2000 Narad et al. ................ 709/228
6,393,457 B1 * 5/2002 Allison et al. .............. 709/201
6,751,680 B2 * 6/2004 Langerman et al. ........... 710/3

OTHER PUBLICATIONS

Realtek, Realtek Ethernet Media Access Controller With Power Management RTL8169, pp. 1-92, Mar. 2002.*
Shivam et al, EMP: Zero-copy OS-bypass NIC-driven Gigabit Ethernet Message Passing, ACM, pp. 1-7, 2001.*

* cited by examiner

*Primary Examiner*—Frank Duong
(74) *Attorney, Agent, or Firm*—Bacon & Thomas, PLLC

(57) ABSTRACT

Method for increasing the transmit and receive efficiency of an embedded Ethernet controller, which is applicable to an embedded Ethernet controller connected with a local area network and a wide area network respectively for handling packet processing by utilizing a direct memory access structure via an independent data bus, includes the steps of mapping each said receive buffer into a plurality fo fixed size packet storage spaces each providing individually separated memory spaces in four-byte alignment to store a packet header, packet CRC and packet data, as well as mapping a surplus memory space from a receding packet, such that it is only necessary to move and change the packet header in the receive packet and then insert a required protocol header into the surplus memory space to convert the receive packet into a transmit packet.

8 Claims, 8 Drawing Sheets

METHOD FOR INCREASING THE TRANSMIT AND RECEIVE EFFICIENCY OF AN EMBEDDED ETHERNET CONTROLLER

BACKGROUND OF THE INVENTION

1) Field of the Invention

The invention herein relates to a method for increasing the transmit and receive efficiency of an embedded Ethernet controller transmit and receive efficiency.

2) Description of the Prior Art

Due to the prolific growth of the computer information industry in recent years, a variety of electronic products and peripheral equipment have been continuously developed and, furthermore, widely utilized in life and work environments. Such development trends have not only quickened information dispersal speed and efficiency, but have greatly benefited human life and work. To meet user demand, firms that design and manufacture such said electronic products are producing convenient, portable, and easy-to-use electronic products, each based on lightweight and ultra-compact design concepts and the availability of a wide range of different function expansion components that can be plugged into the said electronics, thereby providing for the flexible application of electronic products developed.

The devices commonly being utilized at present in small home or personal offices (SOHO) for connecting to a plurality of personal computers and wide bandwidth networks are called as residential gateways or SOHO routers (both of them are referred as gateway in this invention). Referring to FIG. 1, the internal key components of the said gateway(s) include a central processing unit 2 and one to three Ethernet media access controllers 3 (Ethernet MAC). Conventionally, the said controllers 3 are independently and individually mounted on a circuit board, but they are now integrated into an ASIC chip as an embedded Ethernet MAC controllers (E_MAC) along with other components and installed into the said gateway(s), which not only effectively reducing the physical size of embedded Ethernet MAC controllers, but also enabling the transmission and reception of Ethernet packets. Generally speaking, since the operating principles of the said embedded Ethernet MAC controller 1 involves the utilization of a bus master direct memory access (M_DMA) controller circuit 4 that enables each said Ethernet MAC to access data via the bus master and thus directly access data in memory 5 without going through the central processing unit 2, the task load of the central processing unit 2 is thereby lessened to increase the operating efficiency of the said embedded Ethernet MAC controller 1.

Generally, there are two main types of management for the embedded Ethernet MAC controller 1 to utilize the buffers and memories installed thereon. The first type accesses the following Ethernet packet information discretely stored in different receive or transmit buffers mapped in the memory 5 (such as synchronous dynamic RAM or SDRAM):

(1) Packet descriptor: Including packet length, status, and allocation address, etc.,
(2) Packet header: Including destination address (DA), source address (SA) and type (TYPE),
(3) Packet data, and
(4) Packet CRC.

For example, a US company namely Intel Corp. utilizes this type in designing the said Ethernet controller(s). Another type places the packet descriptor and packet data together in a same receive or transmit buffer, for example, a Taiwanese company namely Realtek Semiconductor Co. utilizes such a type in designing the said Ethernet controller(s). In the method of the said first type, the buffer memory allocation of the said Ethernet controller(s) is more flexible, however since the operation of the master bus direct memory access (M_DMA Cycle) must be tasked twice, this squanders one instance of bus arbitration time. In the method of the second type, since the said Ethernet controller(s) are incapable of executing space allocation of the buffer dynamic memory, the space allocation of the buffer memory is relatively inflexible, though only a single instance of bus arbitration time is required.

The controller designed in the invention is mainly based on the method of the said second type, and is improved and embedded in a single chip to effectively raise the allocation flexibility of its buffer memory space and thereby increase its overall efficiency. As for the method of the said first type, since the present invention has no intention to improve the controller therefor, the method of the said first type will not be further elaborated in the following description of the invention.

In the said embedded Ethernet MAC controller designed by the said method of the second type, the packet processing can be divided into two sections, i.e. transmit module Tx and receive module Rx, depending on the way of processing the packets. Generally, the said Tx needs approximately four to eight fixed-size transmit buffers (respectively labeled Tx-Buffer #0 . . . Tx-Buffer #n, wherein n=0, 1, 2, 3, . . . ), as indicated in FIG. 2, that are utilized for temporarily storing the transmit packets, each Tx-Buffer using two registers, $X_{STATUS}$ and $X_{ADDR}$, to map and manage the buffer areas. Within the said registers, $X_{STATUS}$ is utilized to report the transmit status as well as define some of the specific transmit setting and the transmit packet length, while $X_{ADDR}$ is utilized to set the starting address (transmit packet's address for Tx descriptor) of a transmit packet in the transmit buffer (Tx-Buffer), the transmit operating principle thereof is described as follows:

First, the central processing unit (CPU) writes the transmit packet into the successive positions within SDRAM sequentially, wherein the starting position being written is corresponding to the value in $X_{ADDR}$ register, and when the CPU issues a transmit trigger command with respect to a Tx enable bit in the $X_{STATUS}$ register, it activates the function of the master bus direct memory access (M_DMA) of the transmit module Tx to read the packet from the starting position corresponding to the $X_{ADDR}$ register in the SDRAM after obtaining the control right to access the master bus, and to write the transmit packet into the internal transmit first-in first-out (FIFO) data queue of the said embedded Ethernet MAC controller 1 for transmitting. The status after transmission will then be written back into the status bit in $X_{STATUS}$ register.

With respect to the receive module Rx, it needs approximately two to four adjustable receive buffers (respectively labeled Rx-Buffer #0 . . . Rx-Buffer #n, wherein n=0, 1, 2, 3, . . . ), as indicated in FIG. 3, that are utilized for temporarily storing the receive packets each including the following items:

(1) A Rx packet descriptor that occupies four bytes of memory space;

(2) Packet header: Including the destination address (Rx-DA) and the source address (Rx-SA), each occupying six bytes of memory space; and type (Rx-TYPE), occupying two bytes of memory space;

(3) Packet data; and (4) A packet CRC that occupies four bytes of memory space.

Each Rx-Buffer utilizes three registers, $R_{STATUS}$, $R_{ADR}$, and $R_{DHA\text{-}PTR}$, to map and manage the buffer areas. Within each said register, $R_{STATUS}$ is utilized to report the receive status as well as define some of the specific receive setting, specify the Rx buffer size, and determine whether the M_DMA operation is capable of writing an incoming packet into this buffer. $R_{ADR}$ is utilized to report the starting address of the Rx-Buffer, while $R_{DHA\text{-}PTR}$ is utilized to store the current pointer of the M_DMA operation in the receive module. The receive operating principles thereof is described as follows:

When the Rx_FIFO receives a packet that is larger in size than a certain threshold value, it activates the function of M_DMA of the receive module Rx and writes the receive packet into the Rx-Buffer after obtaining the control right of accessing the master bus. After each of the receive packet is written, the status and length values thereof are written back into the beginning of the receive descriptor.

Additionally, the writing sequence involves therein is described as follows:

First, placing the packet at the address in the SDRAM designated by the $R_{ADR}$ register and thereafter placing the packet being received at the address next to the previous packet until the Rx-Buffer is full (when the Rx-Buffer size is greater than that in the said $R_{STATUS}$), and then placing the next packet into another Rx-Buffer, at which time the preceding Rx-Buffer is released after the process finished.

When the domain ports of a local area network (LAN) transmit packet data through the gateways of the embedded Ethernet MAC controller based on the said design type to the domain ports of a wide-area network (WAN), it has to insert an additional protocol header 30 (such as PPPoE, NAT, and DHCP, etc.) into the Ethernet packet data originally stored in the Tx-Buffer, as indicated in FIG. 4, before the Tx port of the said WAN transmits it to an Internet Service Provider (ISP) end; or, when being utilized in a LAN to transmit to a different IP domain, since it is only necessary to change some of the values in the protocol header of the original Ethernet packet data in the Tx-Buffer and then revise its destination address, source address, and status, the procedure thereof is simpler.

This also means that, the packet data 20 (data in Rx) received from the said LAN, as indicated in FIG. 3, must be moved by the said gateways to the memory area 10, as indicated in FIG. 2, and, only after being added with the required protocol header 30, as indicated in FIG. 4, can be transmitted out through the said WAN. At this time, since the CPU 2 of the said embedded Ethernet MAC controller 1 is required to move the received packet data to another memory area as well as update and re-arrange for transmit buffer usage, this wastes lots of CPU processing performance. Furthermore, referring to the structure shown in FIG. 3, since each packet is consecutively placed in the Rx-Buffer during reception, when the Rx-Buffers serve as Tx-Buffers, no surplus space is available for the additional insertion of protocol headers.

Therefore, how to design a type of embedded Ethernet MAC controller capable of receiving packets sent from LAN, maintaining a major portion of the received packet data at the original storage position in their receive buffers, inserting an additional protocol header before transmitting the packets to a WAN, and thereby effectively preventing. CPU from meaningless time and performance consuming due to moving packet data should be the major target for solving and overcoming the problems in the conventional embedded Ethernet MAC controller.

SUMMARY OF THE INVENTION

In view of this and to improve the numerous shortcomings of the conventional embedded Ethernet MAC controller that occur while mapping storage spaces in the receive and transmit buffers, the inventor of the invention herein conducted extensive research and experimentation that culminated in the successful development and design of a method for increasing the transmit and receive efficiency of an embedded Ethernet controller.

Since the said method consists of mapping packet storage space of fixed size in each said receive buffer and, furthermore, providing individually separated memory space, in four-byte alignment, to store packet headers, packet CRCs, and packet data, as well as utilizing surplus storage space of preceding packet to map a surplus memory space such that after the said controller receives packets from a said LAN, it is only necessary to move and change the packet header in the receive packet and then insert the required protocol header into the said surplus memory space, enabling the major portion of the packet data to be maintained at original position and capable of converting the receive packet into a transmit packet and directly transmitting it to the said WAN. The present invention is thus effectively preventing central processor unit from meaningless time consuming due to moving packet data and significantly increasing the receive and transmit efficiency of an embedded Ethernet controller.

The objective of the invention herein is to map packet storage space of fixed size in each said receive buffer and, furthermore, utilize it as memory space for storing packet headers, packet CRCs, and packet data that are individually separate and, furthermore, in a four-byte alignment state. As such, when accessing the data of each said packet storage space, the access operation is processed in units of 32 bits and does not require the execution of byte realignment, thereby effectively preventing the central processor unit from meaningless time and performance consuming due to alignment operations.

The another objective of the invention herein is to map a surplus memory space in the packet storage space of each said receive buffer such that after the said network controller receives a packet from a said LAN, it is only necessary to change the packet header in the buffer and insert the required protocol header into the said surplus memory space to maintain a major portion of packet data in the original position for converting the receive packet into a transmit packet and directly transmitting it to a said WAN. Therefore, the present invention effectively prevents central processor unit from meaningless time consuming due to moving packet data and significantly increases the receive and transmit efficiency of an embedded Ethernet controller.

DETAILED DESCRIPTION OF THE INVENTION

Figure 1:
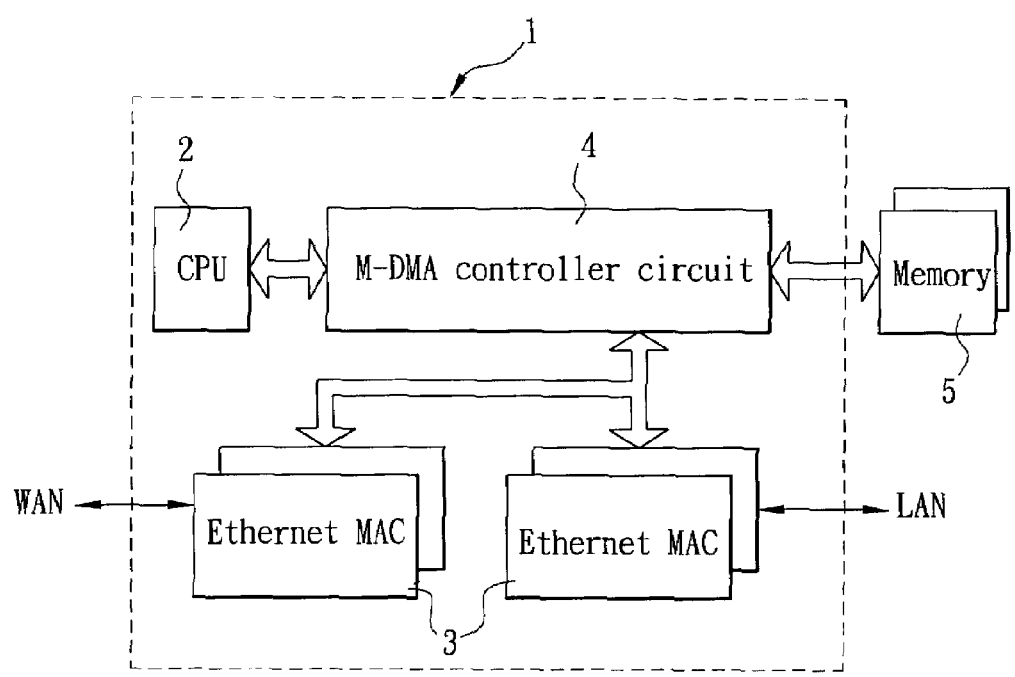
FIG. 1 is a block diagram of a conventional embedded Ethernet controller.
Figure 2:
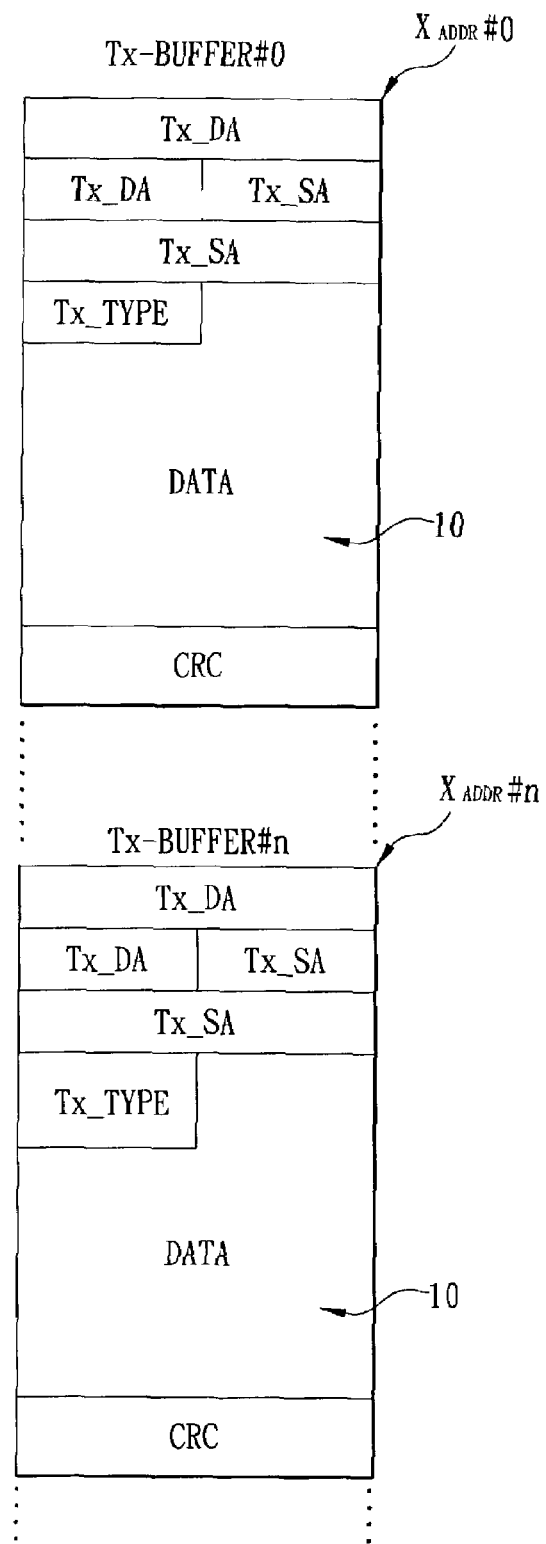
FIG. 2 is a diagram of the memory position allocation of the packet header, packet CRC, and packet data in a transmit buffer of a conventional embedded Ethernet controller.
Figure 3:
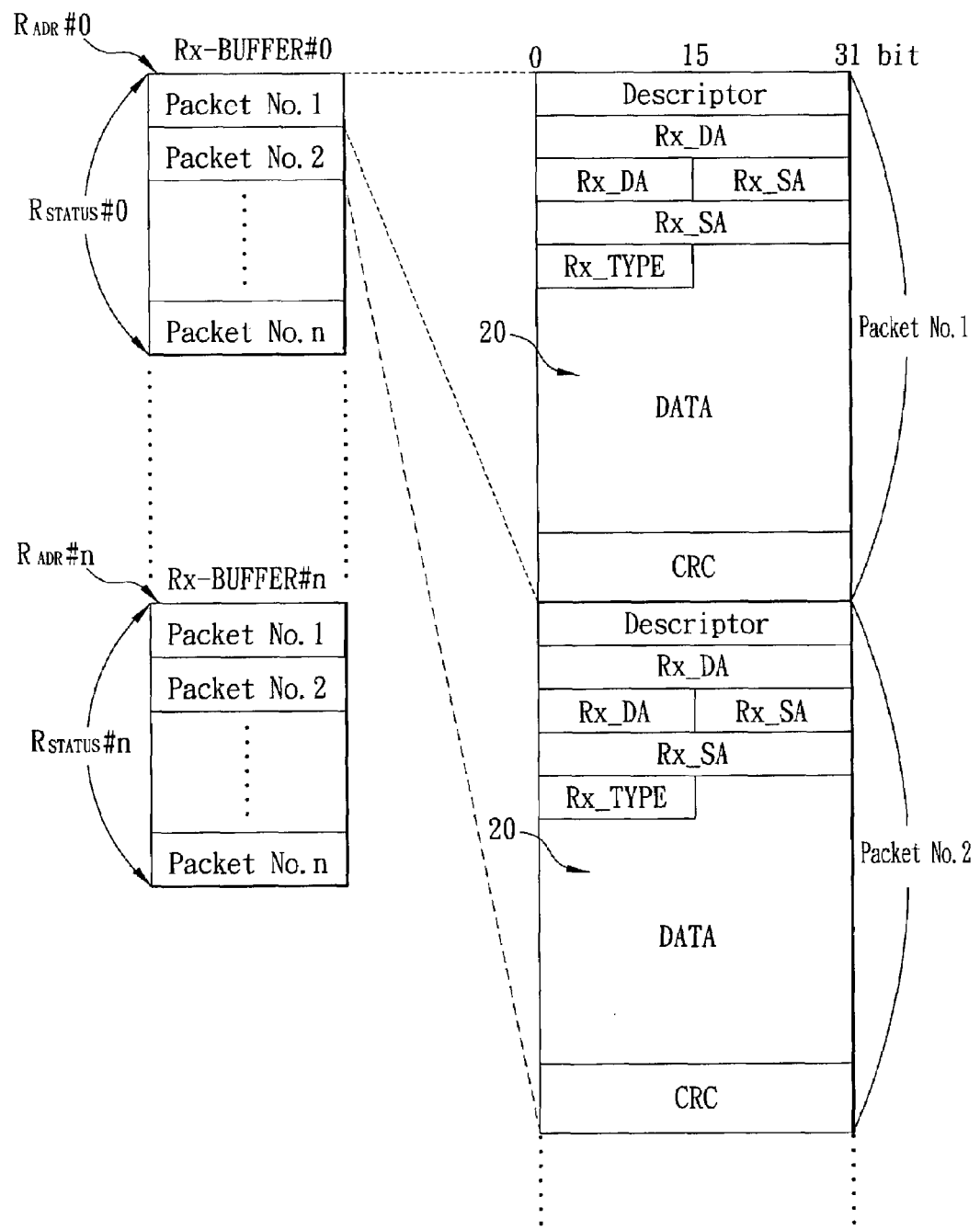
FIG. 3 is a diagram of the memory position allocation of the packet header, packet CRC, and packet data in a receive buffer of a conventional embedded Ethernet controller receive buffer.

As previously described, the invention herein is an improvement of the said embedded Ethernet controller designed according to the said second method that effectively raises its buffer memory space allocation flexibility and thereby increases overall efficiency, the said method only involving a few hardware structure enhancements along with corresponding software revisions (such as for moving packet headers and inserting additional protocol headers), as described below:

In a conventional embedded Ethernet controller, each received packet within the packet storage space mapped in the said receive buffer includes the following information, as indicated in FIG. 3:

(1) Packet descriptor: Occupying four bytes of memory space.

(2) Packet header: Including the destination address (Rx_DA) and the source address (Rx_SA), each occupying six bytes of memory space, and type (Rx_TYPE), occupying two bytes of memory space.

(3) Packet CRC: Occupying four bytes of memory space.

(4) Packet data: The remaining memory space is utilized for storing the packet data, wherein since the packet data size ranges from 46 to 1,500 bytes, the space occupied by each packet differs and, therefore, if a few hardware enhancement are implemented, overall efficiency should be increased. Based on this concept, the invention herein maps the packet storage space in the said receive buffer into a fixed size and, as such, the starting address of the receive packet is the starting address of the said receive buffer, i.e. $R_{ADR}+(N*fixed\ sized)$, and thus, after a receive packet is stored in each packet storage space, the remaining surplus usable memory space is equal to:

Fixed Size−(Descriptor Size+DA Size+SA size+Type Size+Packet Data Size+Packet CRC Size)

Hence:

Fixed Size−(4+6+6+2+{45~1,500}+4) bytes

Figure 4:
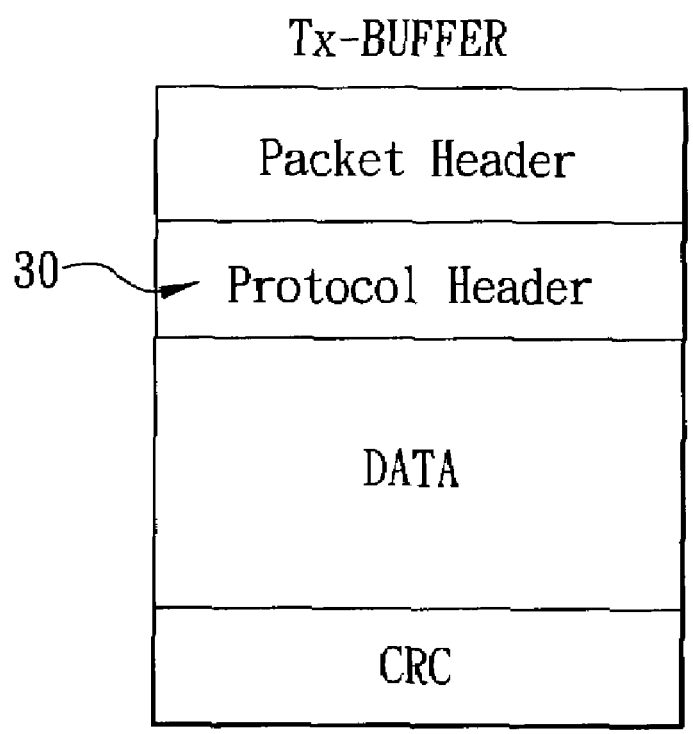
FIG. 4 is a diagram of the memory position allocation after the required protocol header being inserted into the packet storage space of a transmit buffer of a conventional embedded Ethernet controller.

Referring to FIG. 4, utilizing the surplus memory space size, the receive buffer (Rx-Buffer) and the transmit buffer (Tx-Buffer) are integrated into a single entity, the method utilizes the surplus memory space of each packet storage space in the receive buffer as the space needed for inserting an additional protocol header into the next transmit packet and, as such, after the improved embedded Ethernet controller receives a receive packet from a local area network, it is only necessary to move up the packet header in the receive buffer (Rx-Buffer) and modify its content, following which the surplus memory space remaining in a packet storage space is then utilized for inserting the required protocol header to convert the receive packet into a transmit packet ready for being directly transmitted to a wide-area or a local network, at which time, since the majority of items in the receive packet, such as the packet data and packet header etc., are maintained at their original storage positions, this effectively prevents the central processor unit from time and performance consuming due to moving packet data.

Figure 5:
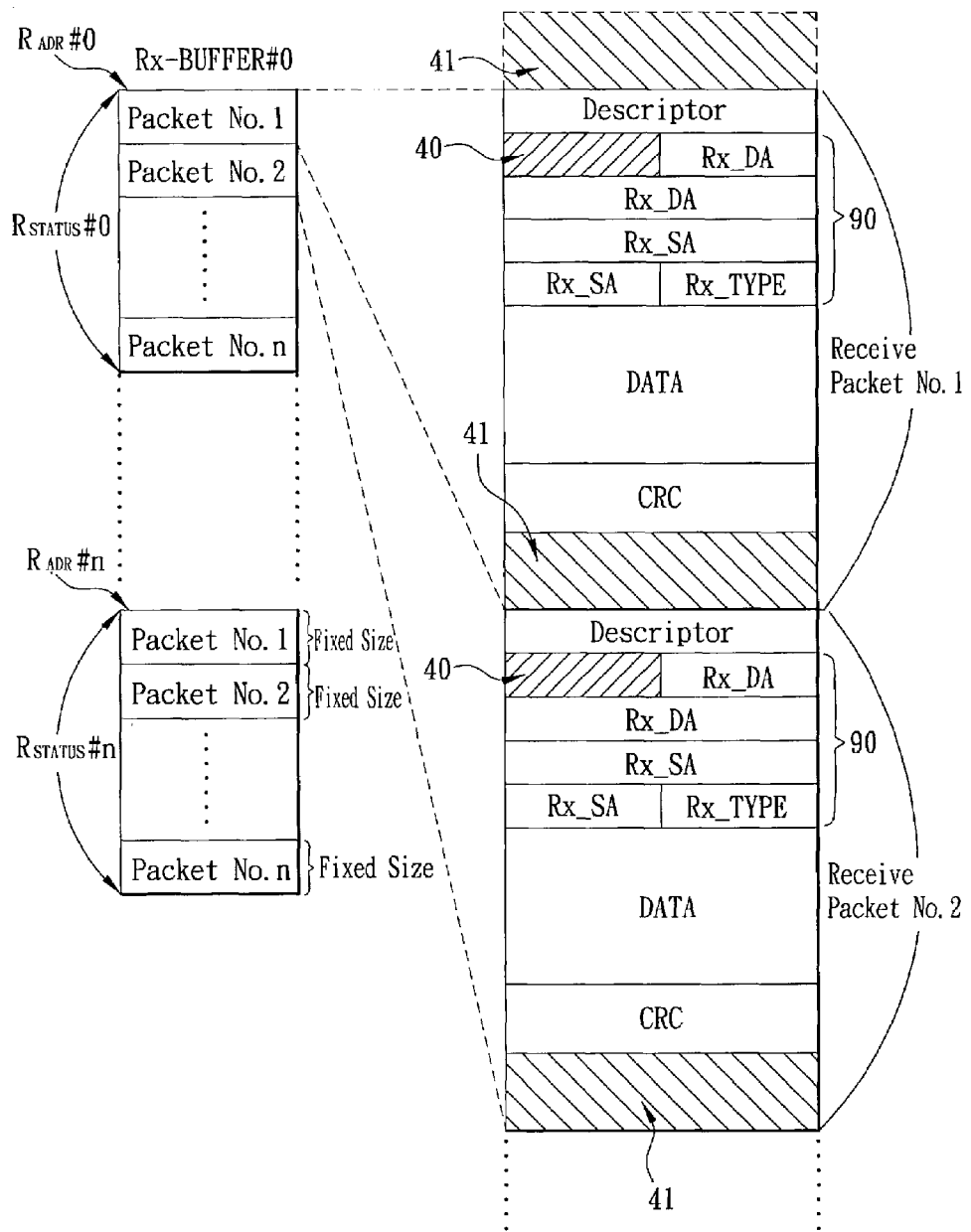
FIG. 5 is a diagram of the memory position allocation in the packet storage space of a receive buffer of an embedded Ethernet controller according to the invention.

As the initialization process of the said buffer memory space is executed, referring to FIG. 5, the invention herein first maps each receive buffer (Rx-Buffer) into a plurality of fixed size packet storage spaces at a size exceeding the maximum length of 1,518 bytes of a standard Ethernet packet for storing the received packets respectively. Additionally, to enable the memory spaces in each said packet storage space respectively for storing the packet descriptor, packet header, packet data, and packet CRC to be independent and individually separated with each other, the invention herein adds a two-byte memory space 40 to the memory spaces occupied by the packet descriptor (occupying four bytes), the Rx_DA (occupying six bytes), the Rx_SA (occupying six bytes), and the Rx_TYPE (occupying two bytes), causing the memory spaces for storing the packet header 90 to become arranged in a "four-byte alignment" state such that the memory spaces occupied by the packet header 90 and the packet CRC as well as the remaining memory space for storing the packet data are each configured into a four-byte alignment state and, furthermore, each memory space is independent and individually separated. As such, when the said embedded Ethernet controller operating system accesses packets in the said packet storage space, it is able to access the packets of 32 bits (four bytes) as one unit data, the re-execution of the byte alignment is not required. As for the added two-byte memory space 40, it is set to be automatically skipped during the transmit processing since the transmission of its content is unnecessary, and won't be a burden in packet transmit processing. Furthermore, in the invention herein, a surplus memory space 41 within each fixed size packet storage space is provided for inserting the required protocol header during the transmit processing.

Figure 6:
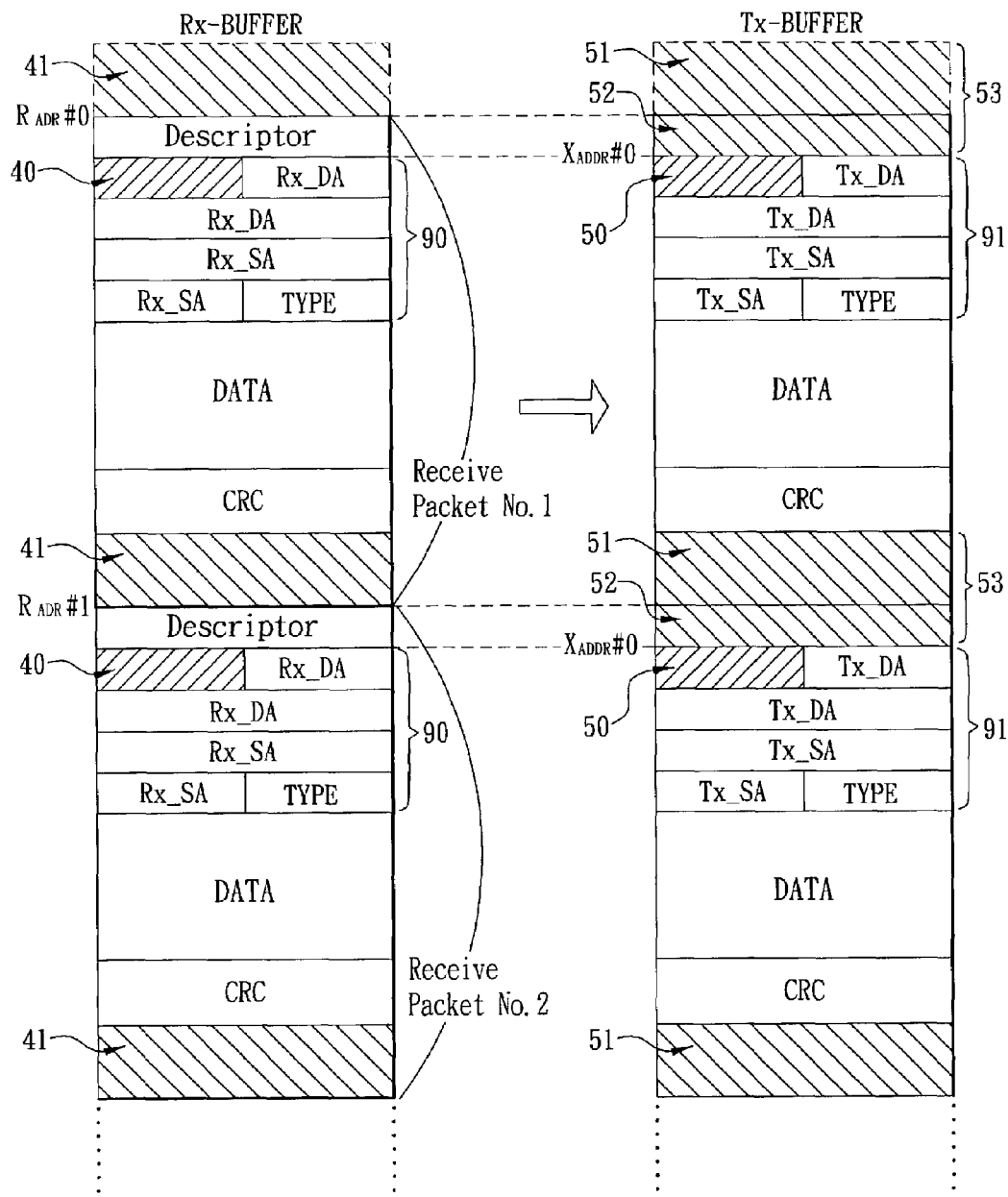
FIG. 6 is a diagram of the changes of the memory position in the packet storage space when the receive buffer of the embedded Ethernet controller according to the invention is converted into a transmit buffer.

In the process of changing the said Rx-Buffer into a Tx-Buffer, referring to FIG. 6, the invention herein first maps each Tx-Buffer into the size capable of storing one packet, wherein the memory space utilized to store the packet header, the packet data, and the packet CRC is totally identical to that of the said Rx-Buffer and maintained unchangeable. Furthermore, a two-byte memory space 50 is reserved in the memory space occupied by the said packet header. As such, the memory space utilized to store the packet header becomes a four-byte alignment and independent space, which is in conjunction with a four-byte memory space occupied by the packet CRC and a four-byte aligned memory space for storing the packet data such that each memory space is configured into four-byte alignment and, furthermore, each memory space is independent and individually separated with other memory space. It is important to note that the added two-byte memory space 50 is set to be automatically skipped during the transmit processing since there isn't any data stored therein. During the said changeover process, a memory space 52 in one Rx-Buffer originally utilized to store the packet descriptor is released, as indicated in FIG. 6, and combined with a surplus memory space 51 reserved by a preceding Rx-Buffer to form a surplus memory space 53 in the said Tx-Buffer.

Figure 7:
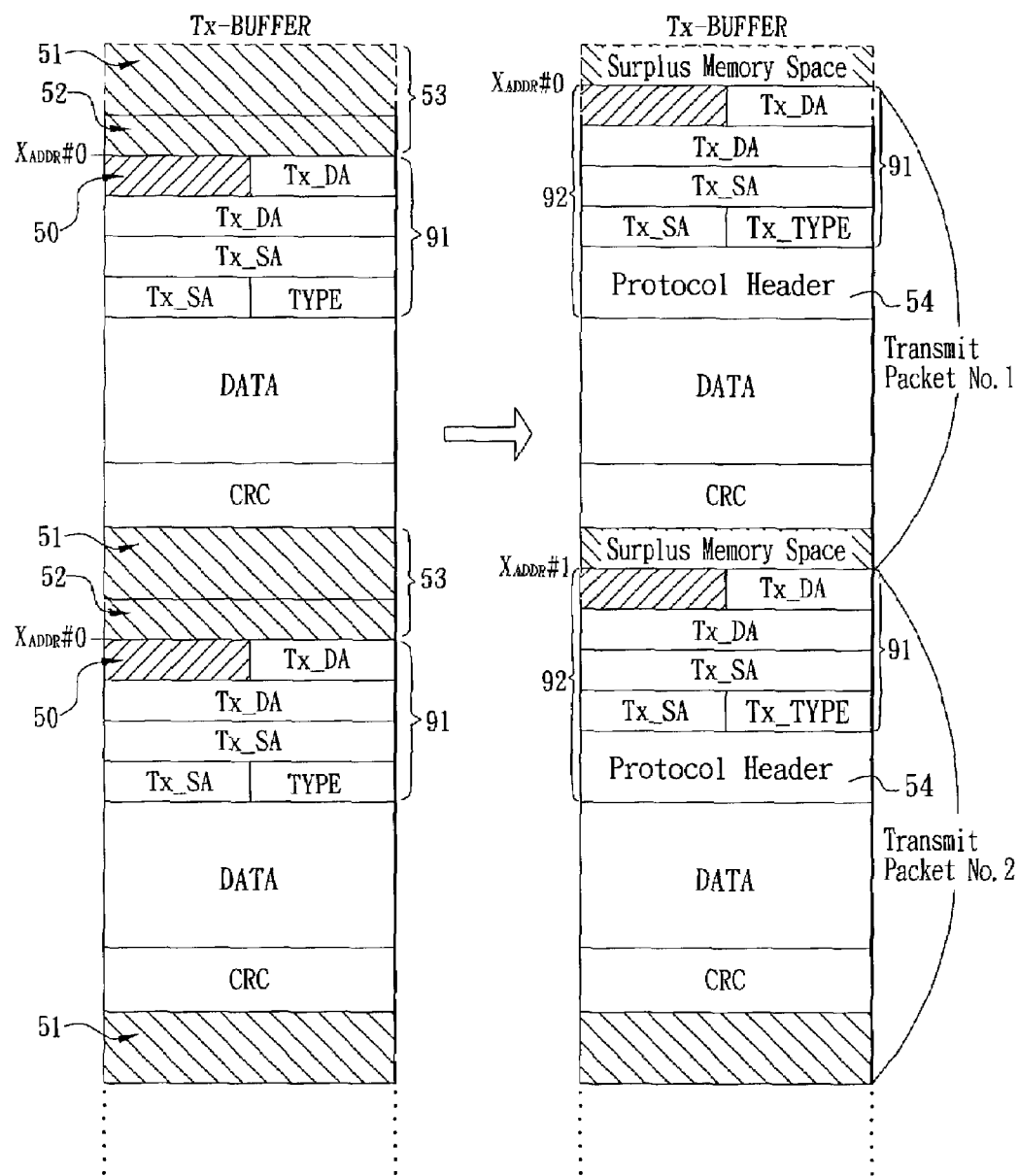
FIG. 7 is another diagram of the changes of the memory position in the packet storage space when the receive buffer of the embedded Ethernet controller according to the invention is converted into a transmit buffer.

Next, when the required protocol header is inserted into the said Tx-Buffer, referring to FIG. 7, the memory space 91 utilized to store the packet header must first be moved toward the surplus memory space 53 in the said Tx-Buffer, thereby releasing memory space 54 for storing the said protocol header. In the invention herein, since the memory space residing in the said Tx-Buffer for storing the packet data and the packet CRC is still identical to that in the original Rx-Buffer and remains unchanged, after inserting the protocol header into the said memory space 54, the said protocol header is combined with the packet header 91 to become a packet header format 92 of the said transmit packet.

In summation of the foregoing section, as actually implemented, the Ethernet media access controller on the said embedded Ethernet controller of the invention herein is connected with a local area network and a wide area network respectively. Furthermore, when the Ethernet media access controller receives a packet transmitted from the said local area network during executing a receive module Rx, the operating system thereof sequentially stores the packet being received into the corresponding packet storage space of the said Rx-Buffers. The descriptor and the surplus memory space 41 in the said Rx-Buffer, as indicated in FIG. 6, are converted into usable surplus memory space 53 in the said Tx-Buffer while starting to execute the transmit module Tx. After changing the said transmit packet header format 91, as indicated in FIG. 7, the said transmit packet header format 91 is then moved toward the said surplus memory space 53, and the memory space 54 is released for inserting the required protocol header before transmitting it to the wide area network. In the invention herein, since the memory space in the said Rx-Buffer and Tx-Buffer utilized to store packet data and packet headers remains unchanged and the central processing unit only has to convert the header 90 of the said received packet into the transmit packet header format 92 and thereby release the memory space 54 therein for inserting the protocol header to efficiently transfer the said transmit packet to the wide area network, meaningless time consuming due to moving packet data is effectively eliminated, which significantly increases the receive and transmit efficiency of the embedded Ethernet controller.

In the most preferred embodiment of the invention herein, if the size of each said packet storage space is larger than or equal to the maximum length of the Ethernet packet plus the said surplus memory space, and is sufficient for storing received Ethernet packets of any length, then the embedded Ethernet controller of the invention herein absolutely does not require to move the packet data and packet CRC stored in the said Rx-Buffer, and is capable of receiving packets from the said local area network and efficiently transmitting them to the said wide area network, while significantly raising the packet processing performance of the embedded Ethernet controller by approximately 20 to 30 percent.

Figure 8:
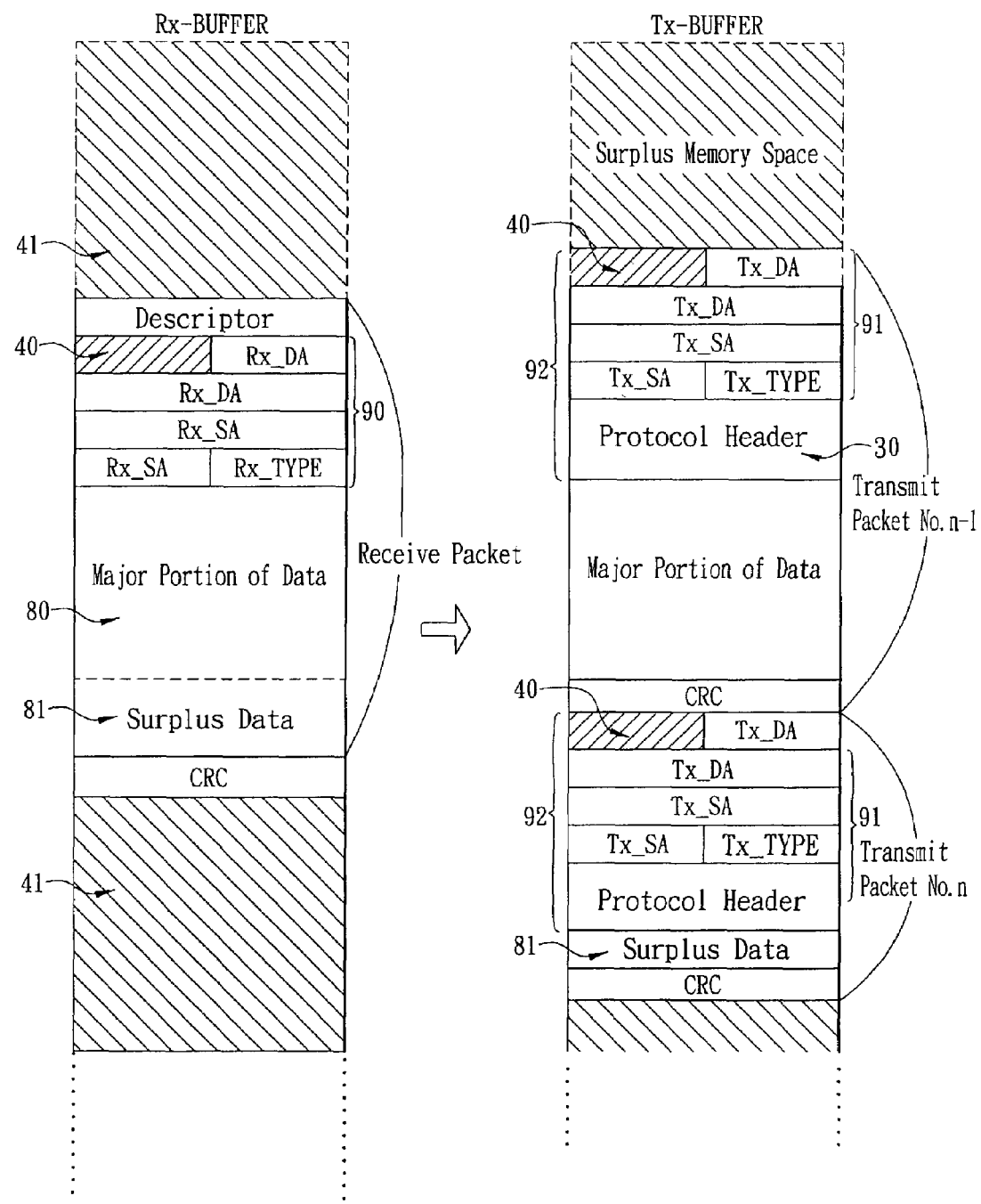
FIG. 8 is a diagram of the changes of the memory position in the packet storage space when the receive buffer of the embedded Ethernet controller according to the invention is converted into a transmit buffer under the circumstance that the said packet storage space in the Rx-Buffer of the embedded Ethernet controller being mapped into the size smaller than the summation of the largest Ethernet packet length and surplus memory space.

In another most preferred embodiment of the invention herein, referring to FIG. 8, if the size of each said packet storage space in the said Rx-Buffer is mapped into the size equal to a predetermined packet length (slightly smaller than the maximum length of the Ethernet packet) plus the said surplus memory space, then when the length of received packets is larger than the said predetermined packet length, the central processing unit converts a major portion of data in the said received packets into the packet data of the n−1 th transmit packet, and converts the surplus data 81 unable to be converted into the n−1 th transmit packet into the n-th transmit packet. Therefore, when the embedded Ethernet controller of the invention herein transmits packet data stored in the said Rx-Buffer to the said wide area network, it only needs to move the said surplus data 81, then convert the said receive packet header 90 to a transmit packet header 91 in the surplus memory space 41 and insert the required protocol header 80, thereby converting the said surplus data 81 to the n th transmit packet and efficiently transmitting it to the said large area network. In the said another preferred embodiment of the invention, since the size of the received packets exceeding the said predetermined packet length seldom occurs and the surplus data 81 thereof is generally quite small, it almost not affect the efficiency of the packet processing executed by the said embedded Ethernet controller. Therefore, the embedded Ethernet controller of the invention still ensure to increase the receive and transmit performance in packet processing by approximately 20 to 30 percent.

The invention claimed is:

1. A method for increasing the transmit and receive efficiency of an embedded Ethernet controller, which is applicable to an embedded Ethernet controller connected with a local area network and a wide area network respectively and configured to handle packet transmit and receive processing between the networks by utilizing a direct memory access structure via an independent data bus to access packets residing in a plurality of receive buffers and transmit buffers in memory, with a packet header and packet data of each said packet stored within the same buffer, said method including:
   mapping a surplus memory space from a packet storage space within each receive buffer during an initialization process;
   moving the packet header in the receive buffer to the surplus memory space after the controller receives packets sent from the local area network;
   changing the packet header with the major portion of packet data maintained at an original position; and
   converting the packet header into a transmit packet in the transmit buffer.

2. A method as claimed in claim 1, further including:
   mapping each said receive buffer into a plurality of fixed size packet storage spaces during the initialization process;
   mapping the said packet storage space for storing a packet descriptor, packet header, packet data, and packet CRC respectively into a state of byte alignment in which the spaces are independent and individually separately.

3. A method as claimed in claim 2, wherein in the packet storage space, the packet descriptor occupies four bytes of memory space, a destination address and a source address in the packet header each occupies six bytes of memory space, a type in the packet header occupies two bytes of memory space, and the packet CRC occupies four bytes of memory space, with the remaining memory space utilized for storing packet data.

4. A method as claimed in claim 3, further including:
   adding a two-byte memory space to the memory space for storing the packet header to become arranged in a four-byte alignment state such that the four-byte memory spaces for storing the packet header and the CRC as well as the remaining memory space for storing the packet data are each configured into four-byte alignment and are independent and individually separated from each other.

5. A method as claimed in claim 4, wherein the two-bye memory space is added into the packet storage space of the receive buffer and contains no stored data and is set to be automatically skipped without being transmitted while executing the transmit processing.

6. A method as claimed in claim 5, wherein in addition to the memory space of the packet storage space of the receive buffer for storing the packet headers and packet CRCs, the remaining memory space thereof is mapped into a memory space for storing the received packet data and a surplus memory space for inserting the required protocol header which is combined with the received packet header to form a transmit packet header format.

7. A method as claimed in claim 6, further including:
sequentially storing the received packets in the packet storage space of the receive buffer, when the controller receives a packet sent from the local area network;
moving the packet header in the receive buffer to the preceding packet storage space in the surplus memory space and modifying the content thereof, while starting to execute the transmit processing; and
converting the receive buffer into the transmit buffer, then inserting the required protocol header into the surplus memory space, and thereby converting the packet header into a transmit packet header format for transmitting to the wide area network.

8. A method as claimed in claim 7, further including:
if the fixed size of each said packet storage space in the receive buffer is mapped into the size equal to a predetermined packet length plus the surplus memory space, then when the length of received packets is larger than the predetermined packet length and the said controller transmits the packets to the wide area network, it is only necessary to move the portions in the receive buffer exceeding the predetermined packet length into the surplus memory space, add the surplus memory space to the header of the receive packet, and then insert the required protocol header into the surplus memory space to convert the header thereof into the transmit buffer header for transmitting to the wide area network.

* * * * *